United States Patent [19]
Niles

[11] 3,739,761
[45] June 19, 1973

[54] FUEL METER MOUNTING FOR AN ENGINE

[75] Inventor: Albert B. Niles, Chillicothe, Ill.

[73] Assignee: Caterpillar Tractor Co., Peoria, Ill.

[22] Filed: July 19, 1971

[21] Appl. No.: 163,629

[52] U.S. Cl. .............. 123/136, 123/195 A, 73/113, 73/114, 73/200
[51] Int. Cl. .......................... F02m 59/00, G01l 3/26
[58] Field of Search .................... 73/113, 114, 200; 123/195 A, 136, 139 R

[56] References Cited
UNITED STATES PATENTS

| | | | |
|---|---|---|---|
| 3,626,916 | 12/1971 | Bottoms | 123/136 |
| 2,832,216 | 4/1958 | Compton | 73/113 |
| 2,796,762 | 6/1957 | Touchman | 73/114 |
| 3,246,508 | 4/1966 | Ueach | 73/114 |
| 3,253,459 | 5/1966 | Sorenson | 73/114 |

*Primary Examiner*—Laurence M. Goodridge
*Assistant Examiner*—Ronald B. Cox
*Attorney*—Charles M. Fryer, Donald C. Feix, Leonard Phillips et al.

[57] ABSTRACT

A fuel meter mounting assembly for the temporary installation of a fuel meter in the fuel injection system of an internal combustion engine having a fuel injection pump, a transfer pump for supplying fuel under pressure to the fuel injection pump and a filter mounting base interposed the transfer pump and the injection pump providing one or more filter mounting locations affording receptacles for selectively mounting the assembly of the present invention to provide a fuel measuring bypass circuit within the fuel injection system.

6 Claims, 2 Drawing Figures

INVENTOR
ALBERT B. NILES

INVENTOR
ALBERT B. NILES

FUEL METER MOUNTING FOR AN ENGINE

BACKGROUND OF THE INVENTION

It is frequently desirable to measure the fuel consumption of a particular engine during actual operating conditions in the field in order precisely to evaluate its level of efficiency under various operating conditions. Such determination is particularly useful when employed in connection with other engine performance evaluating instruments such as that described in the copending application Ser. No. 135,300 of Albert E. Niles et al. entitled "Method and Apparatus for Checking Engine Performance" and filed Apr. 19, 1971, which application is assigned to the assignee of the present application. The system of the prior copending application is effective to test the power output of an engine by precisely measuring the fuel flow rate into the engine for a brief period at a known engine speed and substantially constant loading in a relatively quick, convenient manner without removing the engine from the vehicle or other work installation and without requiring a complex test installation such as a dynamometer. Although the mounting assembly of the present invention is ideally suited for incorporation into the performance computing apparatus of the above-designated prior copending application, it will be recognized that the present invention is not limited to such specific use but rather may be employed in any situation where it is desirable quickly to determine the rate of fuel consumption of the engine.

In the past when it had been desired to mount a fuel flow meter in the fuel injection system of an engine, the fuel lines were required to be removed at some accessible location, not necessarily adapted to receive the fuel flow meter. Furthermore, it is desirable and frequently necessary that the fuel filter be maintained in the fuel injection system to insure efficient engine operation precisely simulating normal operating conditions during the course of the test. Because of the wide variety of types and sizes of engines, each installation of the fuel flow meter was required to be custom-fitted to the particular engine being tested. Upon completion of the testing period, the fuel flow meter was removed and the fuel lines replaced in their original positions. These prior custom fitting procedures are tedious, time consuming, and in view of the labor involved may become economically prohibitive on any regular or continuing testing basis.

SUMMARY OF THE INVENTION

Accordingly, it is an object of the present invention to provide an improved fuel meter mounting assembly for the temporary installation of a fuel meter in the fuel injection system of an internal combustion engine.

Another object is to provide such an improved fuel meter mounting assembly which may be readily adaptable to a wide variety of sizes and types of engines.

Another object is to provide an improved fuel meter mounting assembly of the character described which may be relatively quickly and conveniently installed with a minimum of effort and with a minimum of modification to the existing fuel injection system of the engine.

Another object is to provide an improved fuel meter mounting assembly which enables the fuel filter of the fuel injection system to be maintained in an operating position within the system.

Another object is to provide an improved fuel meter mounting assembly which utilizes the fuel filter mounting block of the existing fuel injection system for providing a receptacle into which the mounting assembly of the present invention is adapted to be installed.

Another object is to provide an improved fuel meter mounting assembly which affords an alternative or auxiliary mounting for the fuel filter upon its removal from the filter mounting block for installation of the mounting assembly of the present invention.

Another object of the present invention is to provide an improved fuel meter mounting assembly which is readily adapted to fuel injection systems having a plurality of filters which are readily isolated from the fuel injection system to insure that the entire volume of fuel from the fuel transfer pump is directed through the fuel meter mounting assembly of the present invention.

Other objects and advantages of the present invention will become more readily apparent upon reference to the accompanying drawings and following description.

DESCRIPTION OF THE PREFERRED EMBODIMENT

Figure 1:
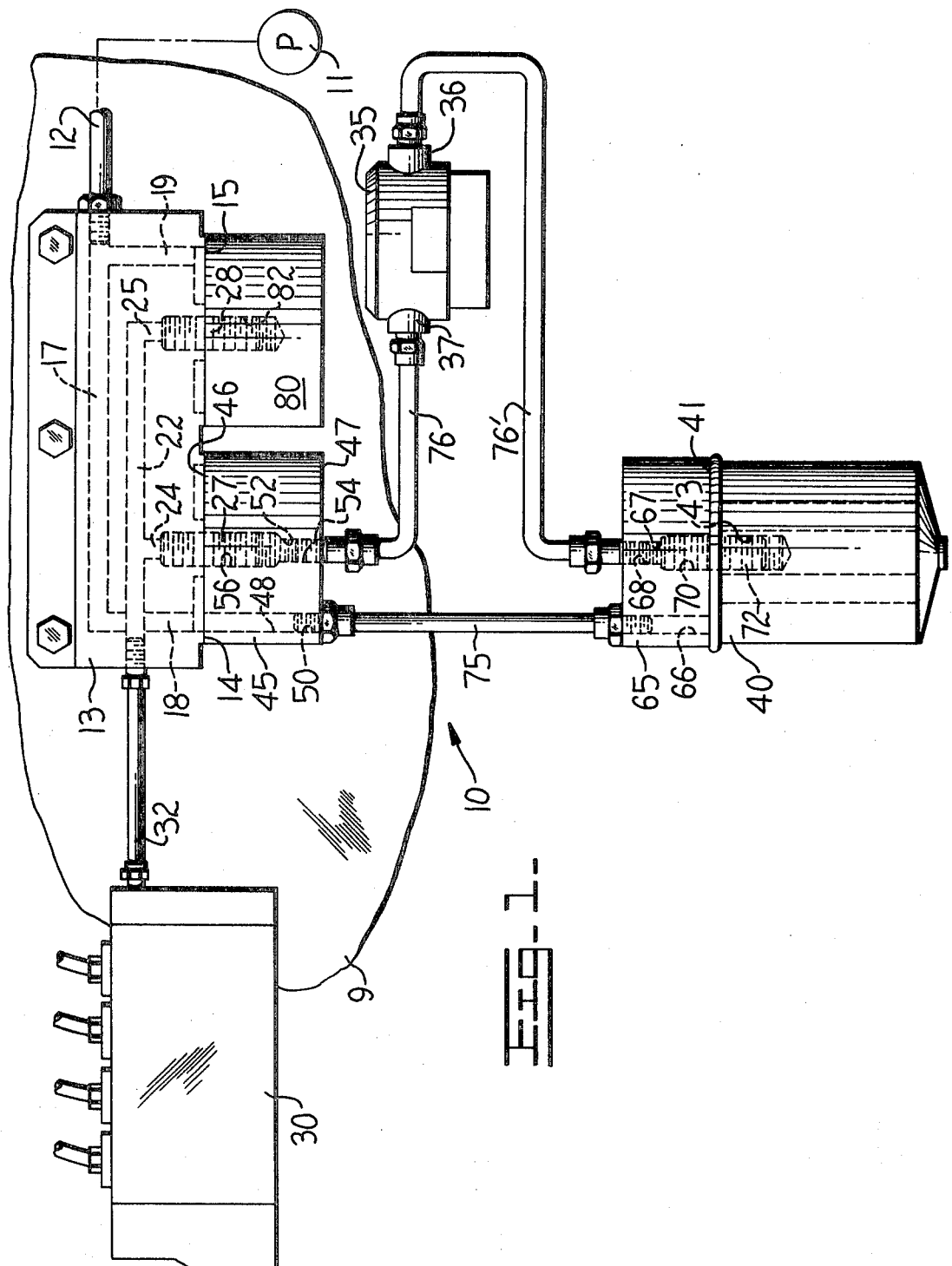
FIG. 1 is a side elevation of a fuel meter mounting assembly embodying the present invention shown mounted in operating position within the fuel injection system of an internal combustion engine.
Figure 2:
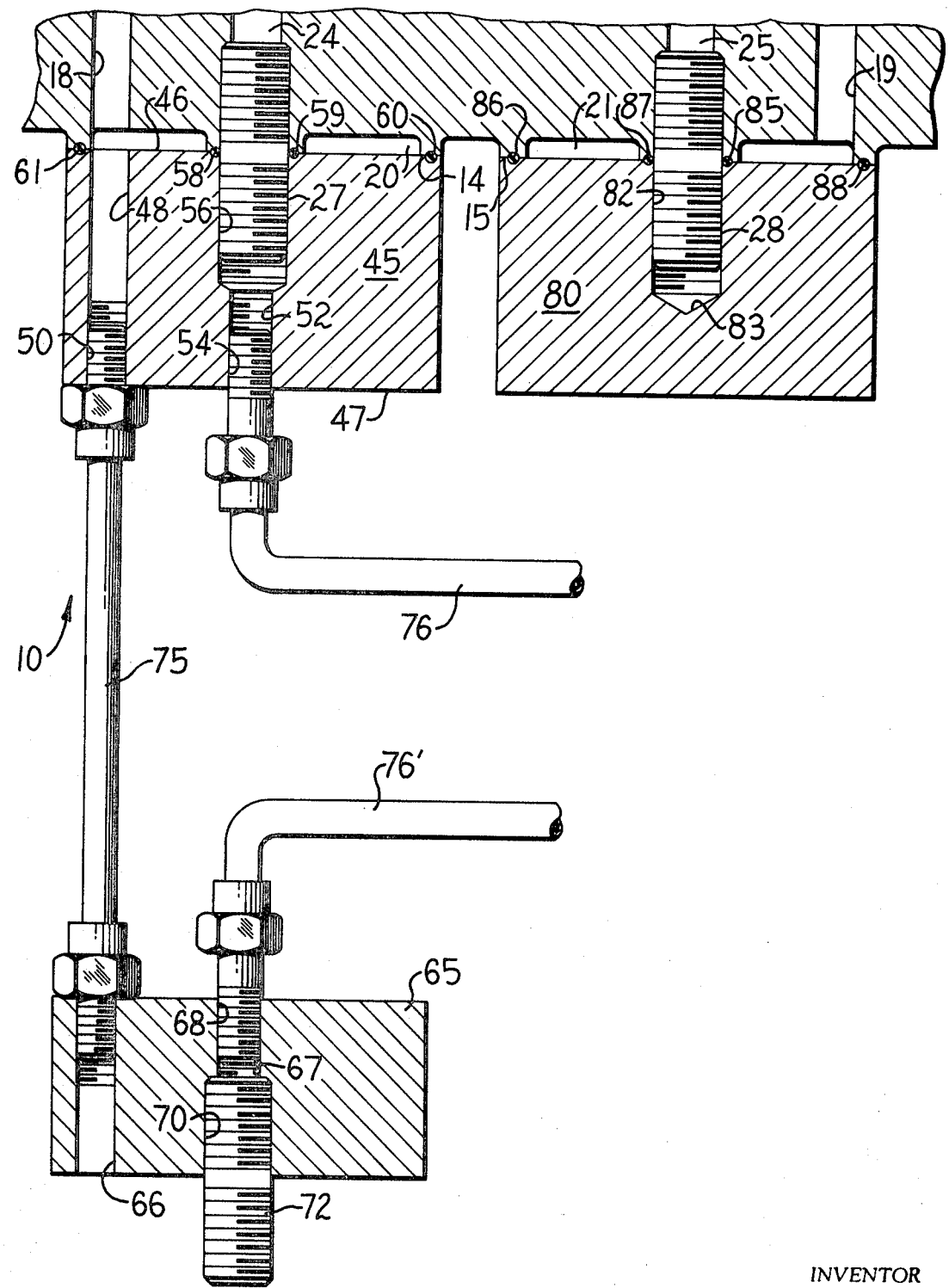
FIG. 2 is a somewhat enlarged fragmentary view of the fuel meter mounting assembly with portions thereof shown in cross section.

Referring more particularly to the drawings, a fuel meter mounting assembly embodying the present invention is generally indicated by the reference numeral 10 in association with a conventional fuel injection system for an internal combustion engine 9 of which only a fragment is shown as it may be of conventional design. The fuel injection system includes a fuel transfer pump 11 which is connected through a conduit 12 to an elongated substantially rectangular filter mounting base 13. The mounting base provides a pair of spaced circular filter mounting pads 14 and 15. A fuel inlet passage 17 is formed within the mounting base and has a pair of branch passages 18 and 19 communicating with the filter mounting pads 14 and 15 respectively. A pair of circular grooves 20 and 21 are individually formed in the mounting pads 14 and 15 in communication with their respectively adjacent inlet branch passages 18 and 19. A fuel outlet passage 22 is formed within the mounting base 13 and has a pair of spaced branch passages 24 and 25 disposed substantially centrally of the filter mounting pads 14 and 15, respectively. A pair of elongated hollow externally screw threaded filter mounting nipples, hollow studs 27 and 28, are individually screw threadably mounted within suitably threaded bores coaxial with the branch passages 24 and 25 of the fuel outlet passage 22 in the filter mounting base 13. The fuel outlet passage 22 is connected to a conventional fuel injection pump 30 by way of an elongated conduit 32 in the usual manner.

The fuel meter mounting assembly 10 generally provides a readily available fuel bypass circuit in which a fuel flow meter 35 is mounted, to determine the volume of fuel being consumed by the engine for providing such data to a computer or for other purposes. The fuel meter may be of conventional construction and provides substantially diametrically opposed inlet and outlet port couplings 36 and 37, respectively.

The fuel meter mounting assembly 10 provides for retention of a conventional fuel filter, which is generally indicated by the reference numeral 40, in the fuel lines. The filter 40 includes an upper mounting end 41 having a centrally disposed internally threaded screw threaded bore 43 which is originally adapted to receive one of the filter mounting nipples 27 or 28 for dependably securing the filter to the filter mounting base 13.

A circular connector block 45 of substantially the same diameter as the filter 40 is provided to permit the relatively quick, convenient installation of the fuel meter mounting assembly 10 on the filter mounting base 13. The connector block has an inner face 46 adapted to engage one of the filter mounting pads 14 or 15 and includes an opposite outer face 47. An elongated fuel inlet bore 48 is formed through the connector block between its inner and outer faces, with the end of the bore adjacent to the outer face thereof having internal screw threads 50. The inlet bore 48 is closely adjacent to and in spaced substantially parallel relation to the outer cylindrical surface of the connector block and is thus eccentrically located relative to a fuel outlet bore 52 extending along the axis of the block. The outlet bore has a screw threaded end 54 adjacent to the outer face 47 of the connector block and an opposite somewhat larger diameter screw threaded bore 56 adjacent to the inner face 46 of the connector block. The larger threaded bore 56 is adapted to threadably engage with one of the filter mounting nipples 27 or 28 after removal of the associated filter 40 with the inlet bore 48 of the block 45 registering with the branch passage 18 or 19 of the fuel inlet passage 17 by way of the circular grooves 20 or 21 in the filter mounting base 13. In this example, block 45 is disposed against filter mounting pad 14 in particular and thus inlet bore 48 registers with passage 18 through groove 20. Intermixing of fuel between the inlet bore 48 and the outlet bore 52 is precluded by an O-ring seal 58 disposed within a suitable groove 59 circumscribing the outlet bore and a substantially large diameter O-ring 60 disposed within a circular groove 61 in the inner face 46 of the connector block closely adjacent to its periphery. It will be apparent that upon installation of the connector block 45 in the above-described manner, the O-rings 58 and 60 will be brought into intimate sealing engagement with the adjacent filter mounting pad 14 on the filter mounting base 13.

An auxiliary filter adapter block 65 is provided in the fuel meter mounting assembly 10 for supporting the fuel filter 40 previously removed from the filter mounting base 13 to permit installation of such assembly. The auxiliary adapter block is substantially similar to the connector block 45 with the exception of the omission of the O-ring seals and is aligned along the axis of block 45 in spaced relation therefrom. As in the connector block, the auxiliary adapter block 65 includes a fuel inlet passage 66 near the cylindrical surface thereof and a central outlet passage 67. One end of the outlet passage provides internal screw threads 68 with the opposite end having a somewhat enlarged screw threaded portion 70. Installed within such opposite end is an elongated filter mounting nipple 72 substantially identical to the filter mounting nipples 27 and 28 of the filter mounting base 13. Accordingly, the auxiliary adapter block is able to support the fuel filter 40 in the same manner in which the filter is normally supported on the filter mounting base 13.

Inlet and outlet fuel transfer conduits or lines 75, 76, and 76', respectively, are provided in interconnecting relation between the fuel meter 35, the connector block 45 and the auxiliary adapter block 65. The inlet conduit 75 is secured at its opposite ends by suitable coupling members threaded into the threaded inlet bore 48 and the inlet passage 66 of the connector block 45 and auxiliary adapter block 65, respectively. The first outlet conduit section 76 is similarly secured at its opposite ends by suitable connectors in the threaded outlet bore 52 of the connector block 45 and outlet port 37 of the fuel meter 35. The other outlet conduit section 76' connects passage 67 of block 65 with the meter inlet port 36 through similar threaded couplings.

A circular substantially solid cover block 80 which is substantially the same size and diameter as the connector block 45 but does not have the internal ports or passages provided in the latter is used to close the one of the filter mounting pads 14 and 15 which is not engaged by block 45, pad 15 in this instance. The cover block does, however, include a central internally screw threaded bore 82 which has a bottom end 83 within the block. The bore 82 receives the filter mounting nipples 28 extending from the filter mounting base 13 to retain cover block 80 thereon. A pair of inner and outer O-rings 85 and 86 are individually mounted in a pair on concentric grooves 87 and 88 in the inner face of the cover block to seal the branch passages 19 and 25 to insure that the full volume of fuel from the transfer pump 11 is directed through the fuel measuring bypass circuit by way of the fuel meter 35. A number of cover blocks 80 can be provided corresponding to the number of fuel filters employed in the fuel injection system of any particular engine.

OPERATION

While the operation of the present invention is believed clearly apparent from the foregoing description, further amplification will subsequently be made in the following brief summary of such operation. Prior to the installation of the fuel meter mounting assembly 10, the fuel filters 40 are removed from the filter mounting base 13 by unscrewing the filters from mounting nipples 27 and 28 in the usual manner. The fuel meter mounting assembly is preferably maintained in an assembled condition with the exception of the connector block 45 and cover block 80. The connector block is installed on the filter mounting pad of the mounting base 13 by suitable rotary manipulation to advance the central bore 52 thereof upon the filter mounting nipple 27. The assembly can either be provided with a fuel filter 40 or the fuel filter previously removed from the filter mounting base 13 may be utilized and installed on the auxiliary adapted block 65 in the above described manner. In any event the free ends of the inlet and outlet conduits 75 and 76 are screw threadably secured to the inlet and outlet bores 48 and 52 of the connector block 45 for completing the bypass circuit through the fuel meter 35 with the fuel injection system. If the fuel injection system has but a single fuel filter, then nothing more need be done prior to initiating operation of the engine. However, as previously described, if the fuel injection system provides a multi-filter mounting base, then the appropriate number of cover blocks 80 are installed after removal of their corresponding filters from the base in order dependably to block the inlet and outlet bores 25 and 19, respectively, in the mounting base so as to insure that the entire volume of fuel from the pump is directed through the connector block 45 and returned to the fuel injection system by way of the fuel meter 35. After the testing period is completed, the assembly is quickly and conveniently removable from the fuel injection system by merely disconnecting the ends of the conduits 75 and 76 from the connector block 45 and unscrewing the latter from the mounting base 13. If used, the cover block 80 is similarly removed and the fuel filters 40 reinstalled on the filter mounting base for continued operation of the engine.

In view of the foregoing, it is readily apparent that the present invention provides an improved fuel meter mounting assembly for the fuel injection system of an internal combustion engine, which is readily adapted for relatively quick convenient installation on a wide variety of sizes and types of engines with a minimum of modification of the existing fuel injection system of the engine. The present invention utilizes the already existing filter mounting base to provide immediate access to the interior of the fuel injection system by simply removing the fuel filter therefrom with the mounting assembly readily accommodating the filter therein in order precisely to duplicate or simulate normal operating conditions during the testing period.

While the invention has been described and shown with particular reference to the preferred embodiment, it will be apparent that variations are possible that would fall within the scope of the present invention which is not intended to be limited, except as defined in the following claims.

What is claimed is:

1. A fuel meter mounting assembly, for the temporary installation of a fuel meter in the fuel supply system of an engine having pump means for supplying fuel under pressure to the engine and having support means interposed between the pump means and the engine to receive a removable fuel filter, said support means having a filter receiving surface against which said filter may be disposed and having attachment means for holding said filter against said surface and further having passages extending to said surface through which fuel is transmitted to said filter and received therefrom and having sealing means for said passages between said surface and said filter, comprising; a connection block fittable against said surface of said support means upon removal of said fuel filter and being engagable by said attachment means and including passage means communicating with said passages of said support means through said sealing means, and conduit means interconnecting said connection block and the fuel meter to provide a fuel measuring bypass circuit through the fuel meter and back to the engine.

2. The fuel meter mounting assembly of claim 1 including auxiliary adapter means connected to said conduit means between said connector member and the fuel meter and providing a mounting for receiving said fuel filter as an element of said bypass circuit.

3. A fuel meter mounting assembly, for the temporary installation of a fuel meter in the fuel injection system of an internal combustion engine having a fuel injection pump, transfer pump means for supplying fuel under pressure to the fuel injection pump, and filter support means between the transfer pump means and the fuel injection pump providing a plurality of pairs of openings against which a corresponding number of removable fuel filters may be disposed to filter fuel passing between said transfer pump means and said injection pump comprising; a connector block mounted on said support means in the place of one of said fuel filters and including passage means communicating with a pair of said openings, a plurality of fuel transfer conduits interconnecting said connector block passages and the fuel meter to provide a fuel measuring bypass circuit from the connector block through the fuel meter and back to the connector block, and an auxiliary adapter block connected to said fuel transfer conduits between said connector block and the fuel meter and connecting one of said fuel filters into said bypass circuit.

4. The fuel meter mounting assembly of claim 3 in which said fuel meter has fuel inlet and outlet ports; and said fuel transfer conduits include a fuel line extended between said connector block and said inlet port of the fuel meter by way of said auxiliary adapter block for directing fuel through said filter thereon, and a fuel line interconnecting said outlet port of the fuel meter with said connector block.

5. In combination with an engine having a fuel flow passage defined in part by a fuel filter support with a surface against which a fuel filter may be disposed, wherein said surface has a pair of openings for transmitting said fuel flow to said filter and for receiving filtered fuel therefrom, means for measuring fuel consumption of said engine comprising;
   a flow meter having inlet and outlet ports,
   a connector block secured against said surface of said fuel filter support in place of a fuel filter and having a pair of passages each communicating with a separate one of said openings of said surface,
   an auxiliary block having a filter receiving surface similar to said surface of said support including a second pair of openings for transmitting fuel to a filter and for receiving fuel therefrom;
   a first conduit connecting one passage of said connector block with one opening of said auxiliary block,
   a second conduit connecting the other opening of said auxiliary block with said inlet port of said meter,
   a third conduit connecting said outlet of said meter with the other passage of said connector block, and
   a fuel filter disposed against said surface of said auxiliary block and communicated with said openings thereof.

6. The combination defined in claim 5 wherein said fuel filter support has threaded means at said surface thereof for screwing a filter thereto, wherein said connector block is secured against said surface by said threaded means and further comprising second similar threaded means for securing said filter against said similar surface of said auxiliary surface.

* * * * *